(12) United States Patent
Ren et al.

(10) Patent No.: US 10,803,378 B2
(45) Date of Patent: Oct. 13, 2020

(54) SYSTEM AND METHOD FOR DESIGNING EFFICIENT SUPER RESOLUTION DEEP CONVOLUTIONAL NEURAL NETWORKS BY CASCADE NETWORK TRAINING, CASCADE NETWORK TRIMMING, AND DILATED CONVOLUTIONS

(71) Applicant: Samsung Electronics Co., Ltd., Gyeonggi-do (KR)

(72) Inventors: Haoyu Ren, San Diego, CA (US); Mostafa El-Khamy, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 715 days.

(21) Appl. No.: 15/655,557

(22) Filed: Jul. 20, 2017

(65) Prior Publication Data

US 2018/0268284 A1  Sep. 20, 2018

Related U.S. Application Data

(60) Provisional application No. 62/471,816, filed on Mar. 15, 2017.

(51) Int. Cl.
*G06N 3/04* (2006.01)
*G06N 3/08* (2006.01)

(52) U.S. Cl.
CPC .............. *G06N 3/04* (2013.01); *G06N 3/0454* (2013.01); *G06N 3/08* (2013.01); *G06N 3/082* (2013.01)

(58) Field of Classification Search
CPC .................................................... G06N 3/0454
(Continued)

(56) References Cited

U.S. PATENT DOCUMENTS 7,499,588 B2   3/2009 Jacobs et al.
8,566,264 B2   10/2013 Schafer et al.
(Continued)

FOREIGN PATENT DOCUMENTS

CN   102722712 A   10/2012
CN   105960657 A   6/2014
(Continued)

OTHER PUBLICATIONS

Chua, Kah Keong et al., Enhanced Image Super-Resolution Technique Using Convolutional Neural Network, IVIC 2013, LNCS 8237, pp. 157-164.
(Continued)

*Primary Examiner* — David R Vincent
(74) *Attorney, Agent, or Firm* — The Farrell Law Firm, P.C.

(57) ABSTRACT

Apparatuses and methods of manufacturing same, systems, and methods for generating a convolutional neural network (CNN) are described. In one aspect, a minimal CNN having, e.g., three or more layers is trained. Cascade training may be performed on the trained CNN to insert one or more intermediate layers until a training error is less than a threshold. When cascade training is complete, cascade network trimming of the CNN output from the cascade training may be performed to improve computational efficiency. To further reduce network parameters, convolutional filters may be replaced with dilated convolutional filters with the same receptive field, followed by additional training/fine-tuning.

26 Claims, 10 Drawing Sheets

(58) Field of Classification Search
USPC .................................................. 706/15, 45
See application file for complete search history.

(56) References Cited

U.S. PATENT DOCUMENTS

| | | | |
|---|---|---|---|
| 2015/0134583 A1 | 5/2015 | Tamatsu et al. | |
| 2018/0101750 A1* | 4/2018 | Soldevila | G06F 16/583 |
| 2018/0144242 A1* | 5/2018 | Simard | G06N 3/0454 |
| 2018/0260695 A1* | 9/2018 | Majumdar | G06N 3/0454 |

FOREIGN PATENT DOCUMENTS

| | | |
|---|---|---|
| CN | 103279933 B | 10/2016 |
| CN | 106204499 A | 12/2016 |
| JP | 2014-049118 A | 3/2014 |

OTHER PUBLICATIONS

Girshick, Ross, Fast R-CNN, IEEE International Conference on Computer Vision (ICCV), 2015, pp. 1440-1448.
Song, Youyi et al., A Deep Learning Based Framework for Accurate Segmentation of Cervical Cytoplasm and Nuclei, Engineering in Medicine and Biology Society, 2014 36th Annual International Conference of the IEEE, Aug. 26-30, 2014.
Bevilacqua, Marco et al., Neighbor Embedding Based Single-Image Super-Resolution Using Semi-Nonnegative Matrix Factorization, ICASSP, Mar. 2012, Kyoto, Japan, 4 pages.
Cai, Zhaowei et al., Learning Complexity-Aware Cascades for Deep Pedestrian Detection, 2015 IEEE International Conference on Computer Vision, pp. 3361-3369.
Chang, Hong et al., Super-Resolution Through Neighbor Embedding, Proceedings of the 2004 IEEE Computer Society Conference on Computer Vision and Pattern Recognition, 8 pages.
Dahl, Ryan et al., Pixel Recursive Super Resolution, Mar. 22, 2017, 21 pages.
Dong, Chao et al., Accelerating the Super-Resolution Convolutional Neural Network, Aug. 1, 2016, 17 pages.
Dong, Chao et al., Image Super-Resolution Using Deep Convolutional Networks IEEE Transactions on Pattern Analysis and Machine Intelligence, vol. 38, No. 2, Feb. 2016, pp. 295-307.
Dong, Chao et al., Learning a Deep Convolutional Network for Image Super-Resolution, European Conference Computer Vision 2014, 16 pages.
Dong, Chao et al., Learning a Deep Convolutional Network for Image Super-Resolution, Supplemental Material, European Conference Computer Vision 2014, 13 pages.
Elsayed, Ahmed et al., Effect of Super Resolution on High Dimensional Features for Unsupervised Face Recognition in the Wild, May 13, 2017, 5 pages.
Gao, Xing et al., A Hybrid Wavelet Convolution Network With Sparse-Coding for Image Super-Resolution, 2016 IEEE ICIP, pp. 1439-1443.
Johnson, Justin et al., Perceptual Losses for Real-Time Style Transfer and Super-Resolution, Mar. 27, 2016, 18 pages.
Johnson, Justin et al., Perceptual Losses for Real-Time Style Transfer and Super-Resolution, Supplementary Material, Mar. 27, 2016, 5 pages.
Kim, Jiwon et al., Deeply-Recursive Convolutional Network for Image Super-Resolution, 2016 IEEE Conference on Computer Vision and Pattern Recognition, pp. 1637-1645.
Kim, Jiwon et al., Accurate Image Super-Resolution Using Very Deep Convolutional Networks, 2016 IEEE Conference on Computer Vision and Pattern Recognition, pp. 1646-1654.
Kim, Jaeyoung et al., Residual LSTM: Design of a Deep Recurrent Architecture for Distant Speech Recognition, Mar. 15, 2017, 5 pages.
Kim, Kwang In et al., Single-Image Super-resolution Using Sparse Regression and Natural Image Prior, IEEE TAMPI 2010, pp. 1127-1133.
Ledig, Christian et al., Photo-Realistic Single Image Super-Resolution Using a Generative Adversarial Network, Apr. 13, 2017, 19 pages.
Li, Yue et al., Convolutional Neural Network-Based Block Up-sampling for Intra Frame Coding, Submitted to IEEE Transactions on Circuits and Systems for Video Technology, Feb. 22, 2017, 13 pages.
Li, Xin et al., New Edge Directed Interpolation, IEEE TX on Img Proc, Oct. 2001, pp. 311-314.
Li, Xiaoxiao et al., Not All Pixels Are Equal: Difficulty-Aware Semantic Segmentation via Deep Layer Cascade, CVPR 2017, 10 pages.
Li, Hao et al., Pruning Filters for Efficient Convnets, Published as a conference paper at ICLR 2017, Mar. 10, 2017, 13 pages.
Liu, Ding et al., Learning a Mixture of Deep Networks for Single Image Super-Resolution, Jan. 3, 2017, 12 pages.
Pang, Junbiao et al., Accelerate Convolutional Neural Networks for Binary Classification via Cascading Cost-Sensitive Feature, 2016 ICIP, pp. 1037-1041.
Ren, Jimmy et al., Accurate Single Stage Detector Using Recurrent Rolling Convolution, Apr. 19, 2017, 9 pages.
Ren, Mengye et al., Normalizing the Normalizers: Comparing and Extending Network Normalization Schemes, Published as a conference paper at ICLR 2017, Mar. 6, 2017, 15 pages.
Romano, Yaniv et al., RAISR: Rapid and Accurate Image Super Resolution, Oct. 4, 2016, 31 pages.
Romano, Yaniv et al., Supplementary Material for RAISR: Rapid and Accurate Image Super Resolution, 19 pages.
Shi, Wenzhe et al., Real-Time Single Image and Video Super-Resolution Using an Efficient Sub-Pixel Convolutional Neural Network, 2016 IEEE Conference Computer Vision and Pattern Recognition, pp. 1874-1883.
Sonderby, Casper Kaae et al., Amortised Map Inference for Image Super-Resolution, Published as a conference paper at ICLR 2017, Feb. 21, 2017, 17 pages.
Timofte, Radu et al., A+: Adjusted Anchored Neighborhood Regression for Fast Super-Resolution, ACCV 2014, pp. 111-126.
Timofte, Radu et al., Anchored Neighborhood Regression for Fast Example-Based Super-Resolution, 2013 IEEE International Conference on Computer Vision, pp. 1920-1927.
Timofte, Radu et al., Seven ways to improve example-based single image super resolution, CVPR 2016, 9 pages.
Wang, Zhaowen et al., Deep Networks for Image Super-Resolution with Sparse Prior, 2015 IEEE International Conference on Computer Vision, pp. 370-378.
Yang, Chih-Yuan et al., Fast Direct Super-Resolution by Simple Functions, 2013 IEEE International Conference on Computer Vision, pp. 561-568.
Yang, Jianchao et al., Image Super-Resolution via Sparse Representation, IEEE Transactions on Image Processing, vol. 19, No. 11, Nov. 2010, pp. 2861-2873.
Yu, Fisher et al., Multi-Scale Context Aggregation by Dilated Convolutions, Published as a conference paper at ICLR 2016, Apr. 30, 2016, 13 pages.
Zeyde, Roman et al., On Single Image Scale-Up Using Sparse-Representations, 2011 International Conf. on Curves and Surfaces, pp. 711-730.
Tai, Yu-Wing et al., Super Resolution using Edge Prior and Single Image Detail Synthesis, 2010 IEEE, pp. 2400-2407.
Deshpande, Adit, A Beginner's Guide to Understanding Convolutional Neural Networks, https://adeshpande3.github.io/adeshpande3.github.io/A-Beginner's-Guide-To-Understanding-Conolutional-Neural-Networks, Jul. 20, 2016, 17 pages.
Deshpande, Adit, A Beginner's Guide to Understanding Convolutional Neural Networks Part 2, https://adeshpande3.github.io/A-Beginner%27s-Guide-To-Understanding-Convolutional-Neural-Networks-Part-2/, Jul. 29, 2016, 8 pages.
Deshpande, Adit, The 9 Deep Learning Papers You Need to Know About (Understanding CNNs Part 3), https://adeshpande3.github.io/adeshpande3.github.io/The-9-Deep-Learning-Papers-You-Need-To-Know-About.html, Aug. 24, 2016, 17 pages.
Wikipedia entry, Convolutional neural network, 13 pages.
Wikipedia entry, Peak signal-to-noise ratio, 2 pages.

(56) References Cited

OTHER PUBLICATIONS

Wikipedia entry, Structural similarity, 5 pages.
Holschneider, M. et al., A Real-Time Algorithm for Signal Analysis with the Help of the Wavelet Transform, Wavelets, Springer-Veriag, pp. 286-297.
Foi, A. et al.: Practical poissonian-gaussian noise modeling and fitting for single-image raw-data. IEEE Transactions on Image Processing 17 (2008) 1737-1754.
Zhang, K. et al.: Beyond a gaussian denoiser: Residual learning of deep cnn for image denoising. IEEE Transactions on Image Processing 26 (2017) 3142-3155.
Remez, T. et al.: Deep class-aware image denoising. In: 2017 International Conference on Sampling Theory and Applications, IEEE (2017) 138-142.
Remez, T. et al.: Deep convolutional denoising of low-light images. arXiv preprint arXiv:1701.01687 (2017).
Gu, S. et al.: Weighted nuclear norm minimization with application to image denoising. In: IEEE Conference on Computer Vision and Pattern Recognition. (2014) 2862-2869.
Dong, W. et al.: Nonlocally centralized sparse representation for image restoration. IEEE Transactions on Image Processing 22 (2013) 1620-1630.
Dabov, K. et al.: Image denoising by sparse 3-D transform-domain collaborative filtering. IEEE Transactions on image processing 16 (2007) 2080-2095.
Azzari, L. et al.: Variance stabilization for noisy+ estimate combination in iterative Poisson denoising. IEEE signal processing letters 23 (2016) 1086-1090.
Makitalo, M. et al.: Optimal inversion of the generalized Anscombe transformation for Poisson-Gaussian noise. IEEE Transactions on image processing 22 (2013) 91-103.
Hinton, G.E. et al., "A fast learning algorithm for deep belief nets", Neural computation 18(7), 1527 (2006).
Chen, Y. et al.: Trainable nonlinear reaction diffusion: A flexible framework for fast and effective image restoration. . . . IEEE Transactions on pattern analysis and machine intelligence 39 (2017) 1256-1272.
Schmidt, U. et al.: Cascades of regression tree fields for image restoration. IEEE Transactions on pattern analysis and machine intelligence 38 (2016) 677-689.
Burger, H.C. et al.: Image denoising: Can plain neural networks compete with BM3D? In: IEEE Conference on Computer Vision and Pattern Recognition, IEEE (2012) 2392-2399.
Zhang, K. et al.: FFDnet: Toward a fast and flexible solution for cnn based image denoising. arXiv preprint arXiv:1710.04026 (2017).
Toderici, G. et al.: Full resolution image compression with recurrent neural networks. In: Computer Vision and Pattern Recognition (CVPR), . . . 2017 IEEE Conference on, IEEE (2017) 5435-5443.
Johnston, N. et al.: Improved lossy image compression with priming and spatially adaptive bit rates for recurrent networks. arXiv preprint arXiv:1703.10114 (2017).
Theis, L. et al.: Lossy image compression with compressive autoencoders. arXiv preprint arXiv:1703.00395 (2017).
He, K. et al.: Deep residual learning for image recognition. In: Proceedings of the IEEE conference on computer vision and pattern recognition. (2016) 770-778.
Lim, B. et al.: Enhanced deep residual networks for single image super-resolution. In: IEEE Conference on Computer Vision and Pattern Recognition Workshops. vol. 1. (2017) 3.
Ledig, C. et al.: Photo-realistic single image superresolution using a generative adversarial network. (2017).
Ren, H. et al.: CT-SRCNN: Cascade trained and trimmed deep convolutional neural networks for image super resolution. (2018).
Howard, A.G. et al.: Mobilenets: Efficient convolutional neural networks for mobile vision applications. arXiv preprint arXiv:1704.04861 (2017).
Sandler, M. et al.: Mobilenetv2: Inverted residuals and linear bottlenecks. In: Proceedings of the IEEE Conference on Computer Vision and Pattern Recognition. (2018) 4510-4520.
Everingham, M., et al.: The pascal visual object classes (VOC) challenge. International journal of computer vision 88 (2010) 303-338.
Martin, D. et al.: A database of human segmented natural images and its application to evaluating segmentation algorithms and measuring ecological statistics. . . . In: IEEE International Conference on Computer Vision. vol. 2., IEEE (2001) 416-423.
http://www.compression.cc/: Workshop and challenge on learned image compression (clic). (2018).
Remez, Tal et al., "Deep Class-Aware Image Denoising", 2017 International Conference on Sampling Theory and Applications (SAMPTA) IEEE (2017), pp. 138-142.

* cited by examiner

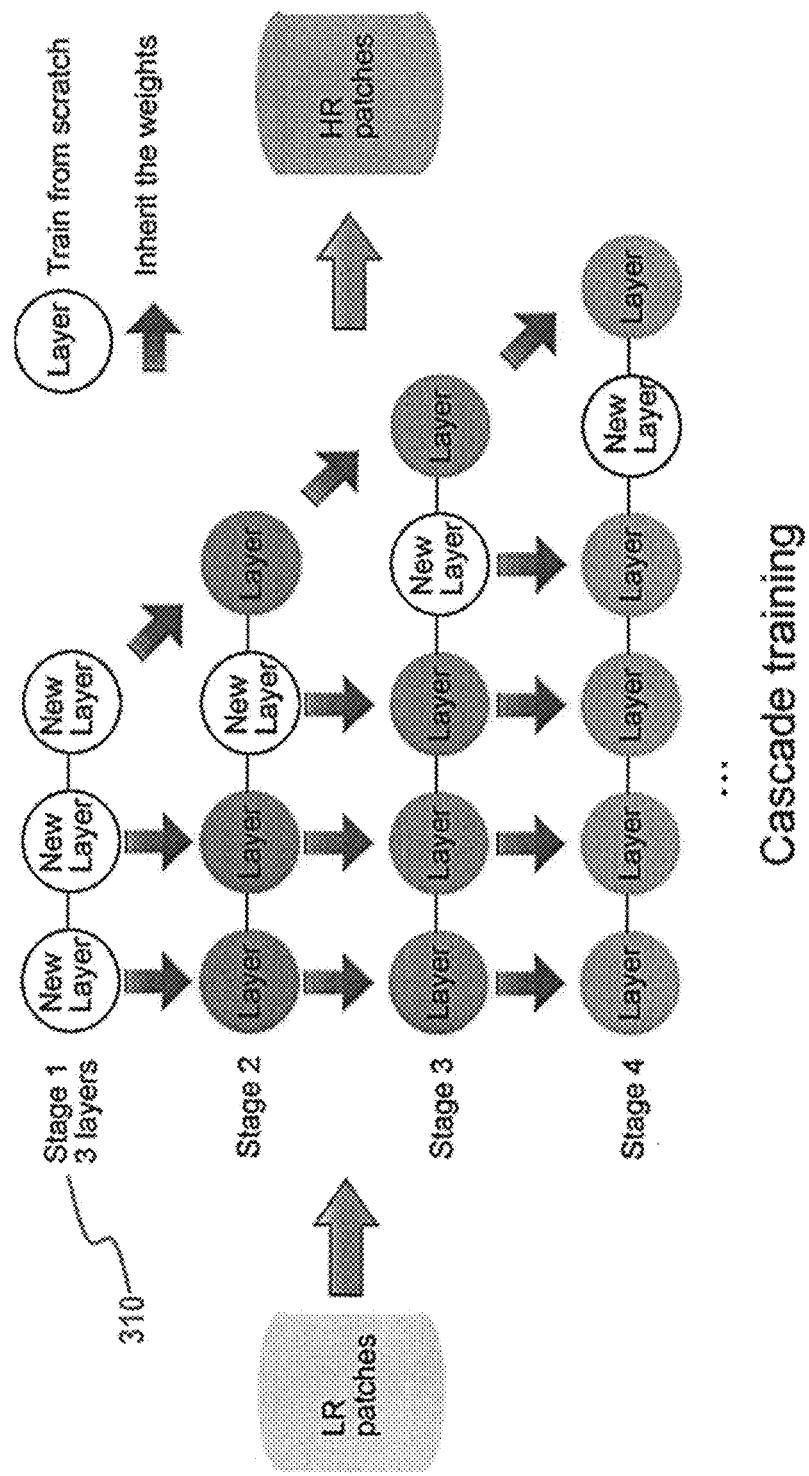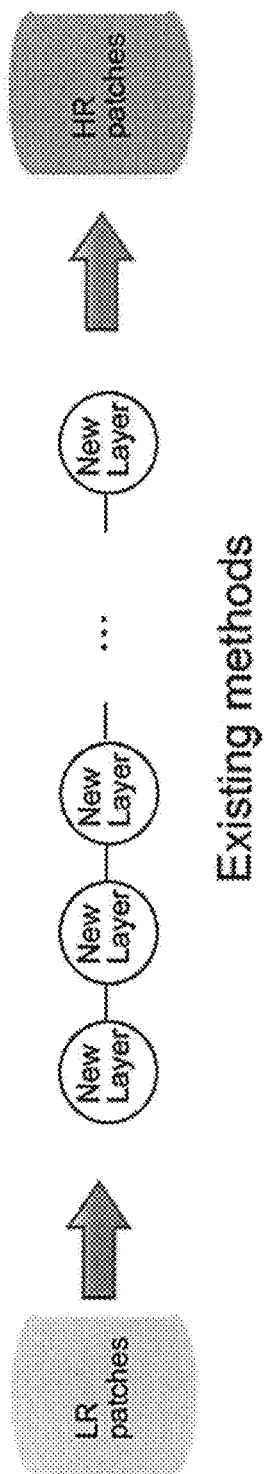
FIG. 3A
FIG. 3B

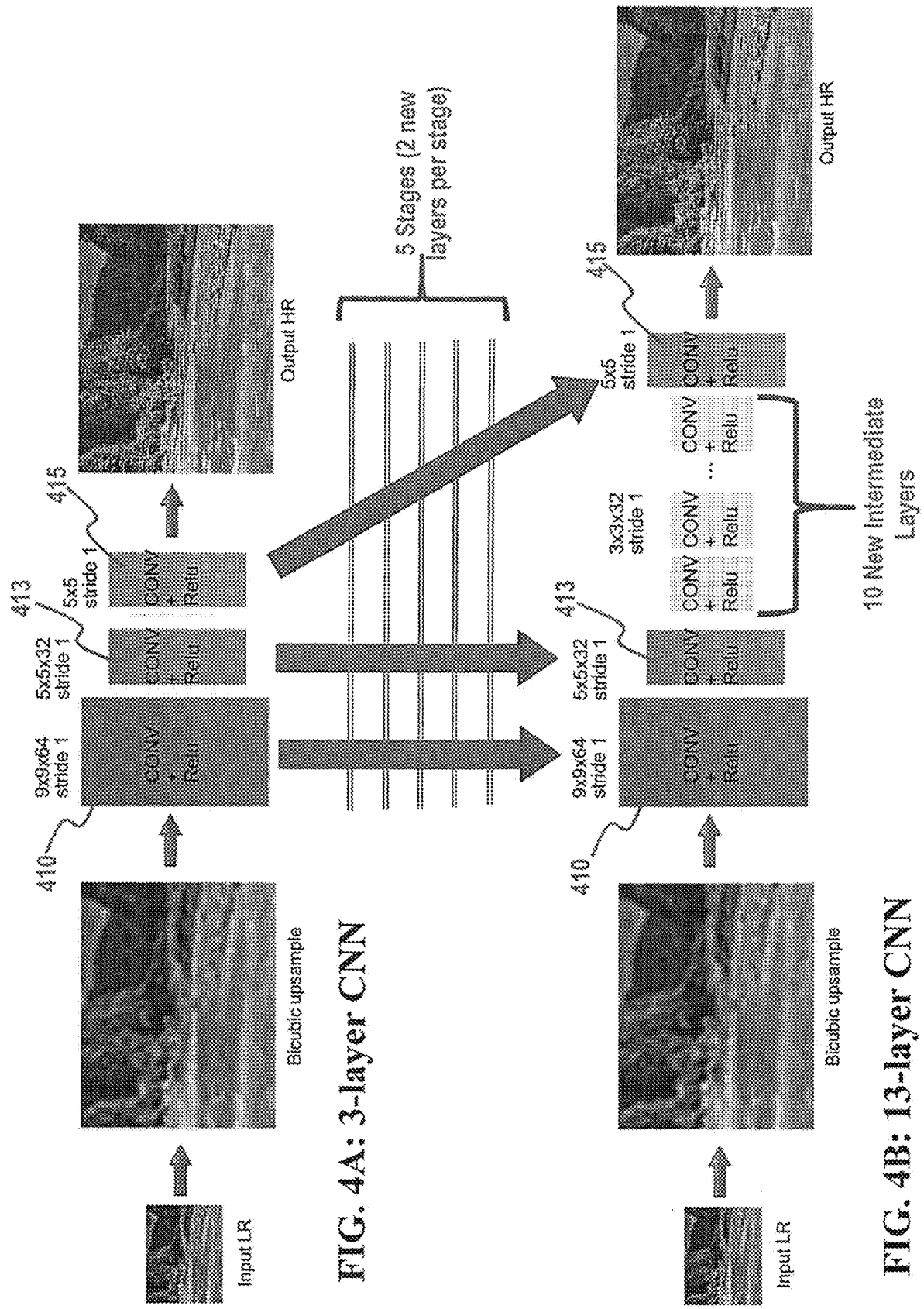
FIG. 4A: 3-layer CNN
FIG. 4B: 13-layer CNN

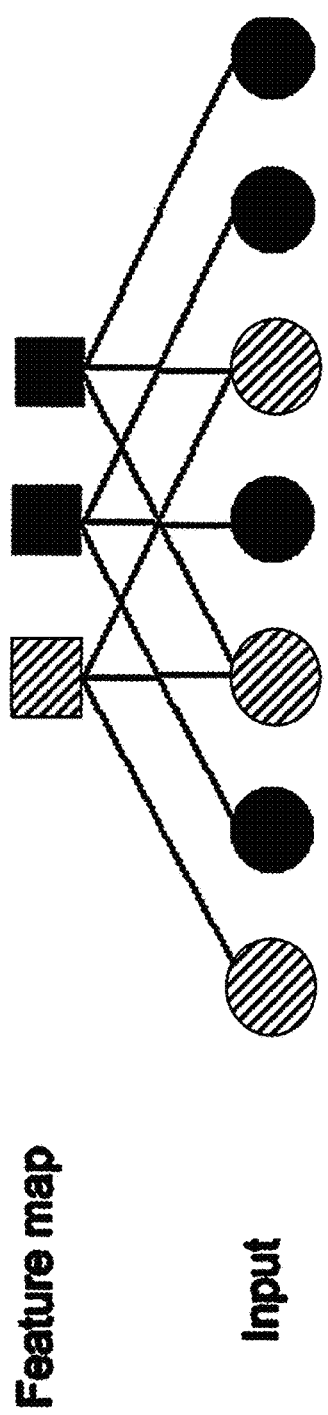
FIG. 8A: 2-Dilated Convolution
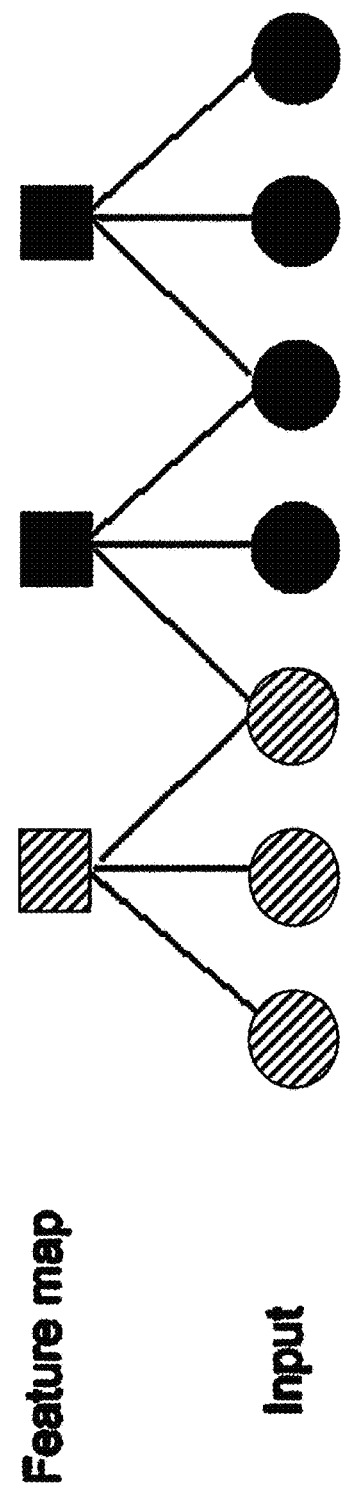
FIG. 8B: Conventional Convolution

SYSTEM AND METHOD FOR DESIGNING EFFICIENT SUPER RESOLUTION DEEP CONVOLUTIONAL NEURAL NETWORKS BY CASCADE NETWORK TRAINING, CASCADE NETWORK TRIMMING, AND DILATED CONVOLUTIONS

PRIORITY

This application claims priority under 35 U.S.C. § 119(e) to U.S. Provisional Patent Application Ser. No. 62/471,816 filed on Mar. 15, 2017, the entire contents of which are incorporated herein by reference.

FIELD

The present disclosure relates generally to image super resolution, and more particularly, to system and method for designing efficient super resolution deep convolutional neural networks by cascade network training, cascade network trimming, and dilated convolutions.

BACKGROUND

Super resolution imaging generates a high resolution (HR) image from a low resolution (LR) image. Super resolution (SR) has wide applicability, from surveillance and face/iris recognition to medical image processing, as well as the straightforward improvement of the resolution of images and video. Many algorithms/systems have been proposed for performing SR, from interpolations (Li, Xin and Orchard, Michael, *New edge-directed interpolation*. IEEE Transactions on Image Processing (TIP), vol. 10, issue 10, pp. 1521-1527 (October 2001), which is incorporated by reference in its entirety), contour features (Tai, Yu-Wing; Liu, Shuaicheng; Brown, Michael; and Lin, Stephen, *Super resolution using edge prior and single image detail synthesis*. 2010 IEEE Int'l Conference on Computer Vision and Pattern Recognition (CVPR), pp. 2400-2407, which is incorporated by reference in its entirety), and statistical image priors (Kim, Kwang In and Kwon, Younghee. *Single-image super-resolution using sparse regression and natural image prior*. IEEE Transactions on Pattern Analysis and Machine Intelligence (TPAMI), vol. 32, no. 6, pp. 1127-1133 (January 2010), which is incorporated by reference in its entirety), to example-based methods which learn from a dictionary of patches, such as neighbor embedding (Chang, Hong; Yeung, Dit-Yan; and Xiong, Yimin, *Super-resolution through neighbor embedding*, 2004 CVPR, pp. 275-282, which is incorporated by reference in its entirety) and sparse coding (Yang, Jianchao; Wright, John; Huang, Thomas; and Ma, Yi, *Image super-resolution via sparse representation*. IEEE TIP, vol. 19, no. 11, pp. 2861-2873 (November 2010), which is incorporated by reference in its entirety).

Recently, convolutional neural networks (CNNs) have provided a significant improvement in SR accuracy. See, e.g., Dong, Chao; Loy, Chen Change; He, Kaiming; and Tang, Xiaoou, *Learning a deep convolutional network for image super-resolution*, 2014 European Conference on Computer Vision (ECCV), pp. 184-199 (hereinafter, "Dong et al. 2014"), which is incorporated by reference in its entirety. Sometimes referred to as "SRCNNs" (i.e., super-resolution convolutional neural networks), their accuracy can be limited by a small structure, e.g., 3-layers, and/or small context reception field. In response, researchers have proposed increasing the size of SRCNNs, but most proposals use a prohibitively large number of parameters, and many of the SRCNNs under discussion cannot be executed in real-time. Due to the large network sizes being proposed, it can be very difficult to even guess at the appropriate training settings, i.e., learning rate, weight initialization, and weight decay. As a result, training may not converge at all or fall into a local minimum.

SUMMARY

Accordingly, the present disclosure has been made to address at least the problems and/or disadvantages described herein and to provide at least the advantages described below.

According to an aspect of the present disclosure, a method is provided which generates a convolutional neural network (CNN), including training a CNN having three or more layers and performing cascade training on the trained CNN to insert one or more intermediate layers into the CNN until a training error is less than a threshold, where the cascade training is an iterative process of one or more stages, in which each stage includes: training the current CNN; determining whether the training error is converging; and, if the training error is converging, inserting a preset number of intermediate layers in the CNN, the weights of each new layer being set to a predetermined setting; and starting a new stage.

According to an aspect of the present disclosure, a method is provided which generates a convolutional neural network (CNN), including training a CNN having three or more layers and performing cascade network trimming of the trained CNN, where the cascade network trimming is an iterative process of one or more stages, in which each stage includes: trimming a set number of layers of the current CNN by reducing dimensions of filters at one or more intermediate layers; determining whether the training error is converging; and, if the training error is converging, determining whether all of the layers of the current CNN have been trimmed; if all of the layers of the current CNN have been trimmed, outputting the network trimmed CNN; and if all of the layers of the current CNN have not been trimmed, starting a new stage.

According to an aspect of the present disclosure, an apparatus is provided for generating a convolutional neural network (CNN), including one or more non-transitory computer-readable media and at least one processor which, when executing instructions stored on one or more non-transitory computer readable media, performs the steps of: training a CNN having three or more layers; performing cascade training on the trained CNN to add one or more intermediate layers until a training error is less than a threshold; and performing cascade network trimming of the CNN output from the cascade training.

According to an aspect of the present disclosure, a method is provided for manufacturing a chipset which includes at least one processor which, when executing instructions stored on one or more non-transitory computer readable media, performs the steps of: training a CNN having three or more layers; performing cascade training on the trained CNN to add one or more intermediate layers until a training error is less than a threshold; and performing network trimming of the CNN output from the cascade training; and the one or more non-transitory computer-readable media which store the instructions.

According to an aspect of the present disclosure, a method is provided for testing an apparatus, including testing whether the apparatus has at least one processor which, when executing instructions stored on one or more non-transitory computer readable media, performs the steps of: training a CNN having three or more layers; performing cascade training on the trained CNN to add one or more intermediate layers until a training error is less than a threshold; and performing cascade network trimming of the CNN output from the cascade training; and testing whether the apparatus has the one or more non-transitory computer-readable media which store the instructions.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 3A and 3B illustrate some of the differences between existing training methods and cascade training according to an embodiment;

FIGS. 4A and 4B illustrate a beginning CNN and an ending CNN, respectively, after cascade training according to an embodiment of the present disclosure;

FIGS. 8A and 8B illustrate some of the differences between dilated convolution in accordance with an embodiment of the present disclosure and conventional convolution, respectively;

DETAILED DESCRIPTION

Figure 1:
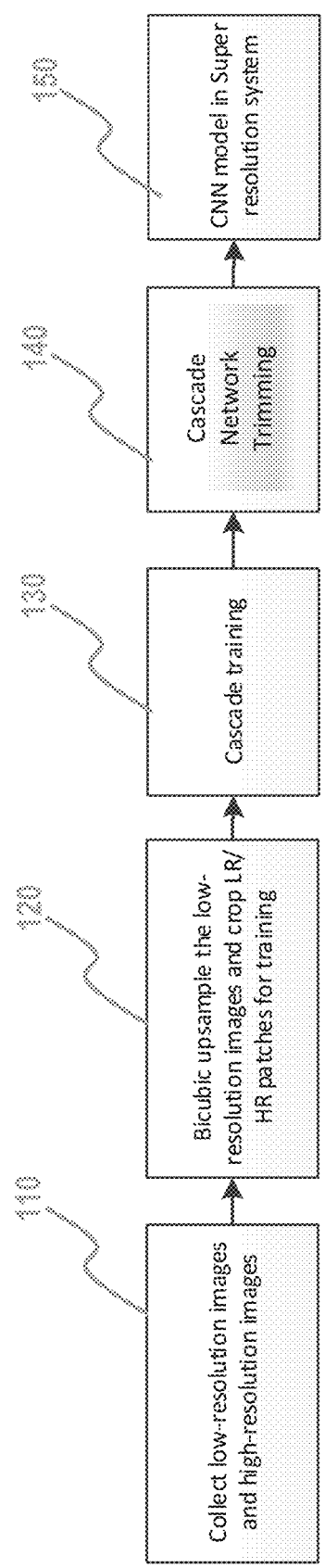
FIG. 1 illustrates an exemplary block diagram of a method for constructing a cascade trained super resolution convolutional neural network (CT-SRCNN), according to one embodiment.

Hereinafter, embodiments of the present disclosure are described in detail with reference to the accompanying drawings. It should be noted that the same elements are designated by the same reference numerals although they are shown in different drawings. In the following description, specific details such as detailed configurations and components are merely provided to assist in the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or custom. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although terms including an ordinal number such as first and second may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

Various embodiments may include one or more elements. An element may include any structure arranged to perform certain operations. Although an embodiment may be described with a limited number of elements in a certain arrangement by way of example, the embodiment may include more or less elements in alternate arrangements as desired for a given implementation. It is worthy to note that any reference to "one embodiment" or "an embodiment" means that a particular feature, structure, or characteristic described in connection with the embodiment is included in at least one embodiment. The appearance of the phrase "one embodiment" (or "an embodiment") in various places in this specification does not necessarily refer to the same embodiment.

This disclosure provides a new approach, or more accurately, several new techniques, for creating an SRCNN. Herein, the term "cascade trained super resolution convolutional neural network" (CT-SRCNN) may refer to all of the new techniques described herein together, or to one or more of the new techniques, which should be made clear by the context in which the term is used. Different from existing approaches that train all the layers from the beginning with unsupervised weight initialization, CT-SRCNN starts training with a small network (e.g., 3 layers). New layers are gradually inserted into the network when the current network cannot adequately reduce the training error.

With this "cascade training" strategy, convergence is made easier, and the accuracy is consistently increased when more layers are used. But while the depth increases, the relative complexity of the network does not, because of the nature of the new layers. More specifically, all the weights of the new layers in CT-SRCNN are randomly initialized, and the learning rate is fixed. This is a great advantage compared to approaches which need to spend a great deal of time and resources tuning the parameters. One specific example of a CT-SRCNN with 13 layers (as shown and discussed further below), the accuracy is competitive with the state-of-the-art image SR networks, while having an execution speed more than 5 times faster, and using only $\frac{1}{5}^{th}$ of the parameters.

In this disclosure, "cascade network trimming" is described, which further refines the CT-SRCNN model by reducing the storage and computational complexities, as well as another method to further improve the efficiency of super resolution deep convolutional neural networks by deploying a form of "dilated convolution," instead of performing the complete conventional convolutional calculations, which may further reduce the CT-SRCNN model complexity.

The rest of the disclosure discusses these three different schemes/features of the CT-SRCNN in order:
 I. Cascade training;
 II. Cascade network trimming; and
 III. Dilated convolution.

Although these three methods/techniques are discussed in the context of the CT-SRCNN, each method/technique could be applied individually or severally to other SR schemes or CNN networks, as would be understood by one of ordinary skill in the art.

FIG. 1 illustrates an exemplary block diagram of a method for constructing a cascade trained super resolution convolutional neural network (CT-SRCNN), according to one embodiment.

At 110, the training set is prepared, meaning a set of low resolution (LR) images with corresponding high resolution (HR) images by which the CT-SRCNN "learns" a model to use when attempting to create high resolution images from low resolution images. In this embodiment, at 120, each LR image is bicubic upsampled and the LR/HR patches cropped in preparation for training. See, e.g., Dong et al. 2014 and Dong, Chao; Loy, Chen Change; He, Kaiming; and Tang, Xiaoou, *Image super-resolution using deep convolutional networks*, IEEE Transactions on Pattern Analysis and Machine Intelligence (TPAMI), vol. 38, no. 2, pp. 295-307 (February 2016) (hereinafter, "Dong et al. 2016a"), which is incorporated by reference in its entirety, for more details concerning this step. As would be understood by one of ordinary skill in the art, there are a variety of pre-training preparation techniques and this disclosure is not limited to this bicubic upsampling and LR/HR patching as a pre-training preparation technique.

At 130, cascade training is performed in accordance with the present disclosure. Embodiments of cascade training according to specific embodiments of the present disclosure are described below. At 140, cascade network trimming is performed in accordance with the present disclosure. Embodiments of network trimming according to specific embodiments of the present disclosure are further described below. At 150, the process is complete and the CT-SRCNN system is ready for real world use.

Although these different processes (i.e., cascade training and cascade network trimming) are described and shown in FIG. 1 as separate and distinct stages/steps, there may be overlap between these functions in actual implementations in accordance with the present disclosure.

I. Cascade Training

Figure 2:
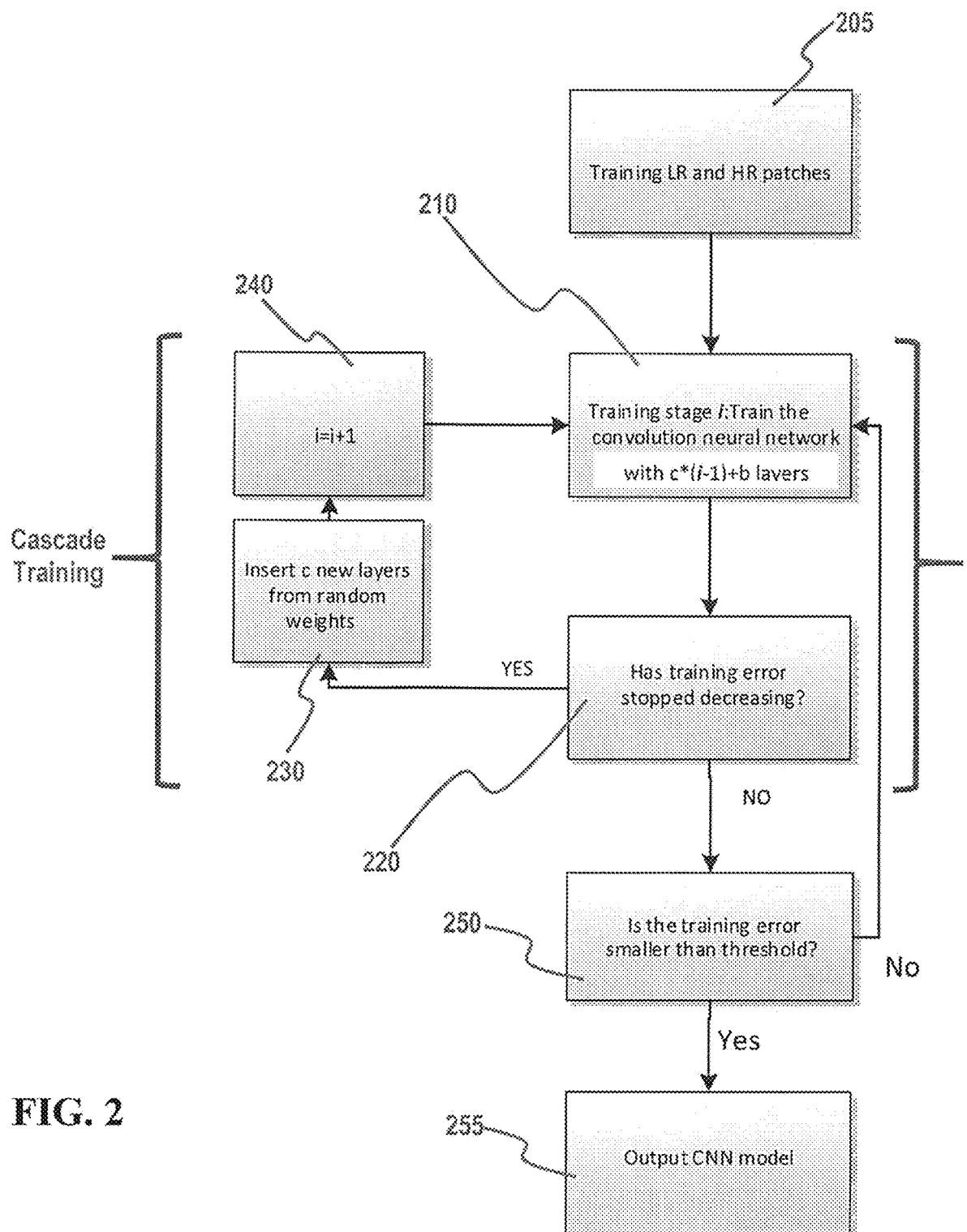
FIG. 2 illustrates an exemplary diagram of cascade training, according to one embodiment.

FIG. 2 illustrates an exemplary diagram of cascade training, according to one embodiment of the present disclosure. At 205, the process of training begins.

At 210, the training starts at stage i=1. The fledgling network starts with b number of layers, and c number of layers are added in each stage where the training error converges (220) or remains higher than a threshold (250). Thus, at each training stage i, a CNN with c* (i−1)+b layers is trained. When stage i=1, the CNN with the first b number of layers is trained. After stage i=1, cascade training starts to add intermediate layers to the b number of layers, specifically c number of layers at a time, as necessary.

At 220, it is determined whether the network has started to converge, e.g., whether the training error has stopped decreasing by a certain amount (from the previous stage). If it has (i.e., the CNN is converging), c number of intermediate layers are added at 230, and the next iteration begins at 240 (i=i+1). During this iterative process, the new layers may be set to any arbitrary weighting, as the intermediate layers will have no influence on the weight matrix sizes of the other layers. Indeed, all existing layers inherit their previous weight matrix. This cascade training iterative process continues, making the CNN deeper and deeper, until the training error is smaller than a threshold at 250, and then the CNN model is output at 255.

FIGS. 3A and 3B illustrate some of the differences between cascade training and existing training methods.

In FIG. 3A, an example of the flowchart in FIG. 2 is shown. In FIG. 3A, b number of layers equals three, as shown at the top (310), which represents the first CNN to be trained, and the number of layers c added in each stage is one. Each new layer has its weights set randomly, while each pre-existing layer inherits its weights from the previous stage. With every newly inserted intermediate layer, the CNN becomes deeper. At each stage, the deeper CNN is trained again. Since most of the weights are inherited from the previous stage, the continuous re-training is relatively easy, even with a fixed learning rate.

Existing methods, however, as shown in FIG. 3B, start with a "complete" set of layers which need to be tuned at the same time. Training all of the layers at the same time as shown in FIG. 3B is far more complex than the scheme shown in FIG. 3A due to the slow convergence, where cascade training trains shallower networks until convergence, incrementally inserts layers with random weights while keeping previously trained layers intact, and retrains the whole network until a deeper network converges. Moreover, cascade training can simply fix the learning rate and generate new layers with random weights.

FIGS. 4A and 4B illustrate a beginning CNN and an ending CNN, respectively, after cascade training according to an embodiment of the present disclosure.

Let x denote an interpolated LR image and y denote its matching HR image. Given a training set $\{(x_i, y_i), i=1, \ldots, N\}$ with N samples, the goal for the CT-SRCNN is to learn a model g that predicts the HR output $\hat{y}=g(x)$. During training, mean square error (MSE) $\frac{1}{2}\Sigma_{i=1}^{N}\|y_i-\hat{y}_i\|$ is minimized over the training set.

In FIG. 4A, cascade training starts from a 3-layer model (b=3). The first layer consists of 64 9×9 filters (410), and the second (413) and the third layer (415) consist of 32 5×5 filters. All the weights (of new layers) are randomly initialized by a Gaussian function with C=0.001, and all convolutions have stride one. "Stride" is one of the hyperparameters of a convolutional layer, and controls how the depth columns around the spatial dimensions (width and height) are allocated-to put it another way, stride indicates how the filter convolves around the input volume, namely, "stride one" indicates that the filter convolves around the input volume one pixel at a time, "stride two" indicates the filter convolves two pixels at time, etc. See, e.g., Definition of "Convolutional neural network," downloaded on Jun. 5, 2017 from Wikipedia at https://en.wikipedia.org/wiki/Convolutional_neural_network; "A Beginner's Guide to Understanding Convolutional Networks—Part 2," downloaded on Jun. 5, 2017 from https://adeshpande3.github.io/A-Beginner%27s-Guide-To-Understanding-Convolutional-Neural-Networks-Part-2/; both of which are incorporated by reference in their entireties.

Returning to FIG. 4A, when the MSE of the current stage stops decreasing significantly, e.g., the error decreases less than 3% in an epoch, the training goes to the next stage. See, e.g. step 220 of FIG. 2. To accelerate the training in this embodiment, two new layers are inserted into the network for each stage (i.e., c=2 in step 230 in FIG. 2). Thus, the training starts from 3 layers, as shown at FIG. 4A, and then proceeds to 5 layers, 7 layers, . . . , and finally 13 layers after five (5) stages. Each new layer consists of 32 3×3 filters. This size ensures a smaller network even when the CNN is becoming progressively deeper. The new intermediate layers are inserted immediately before the last 32 5×5 filters layer 415. The weights from any layer existing in the preceding stage inherits the weights from the previous stage, and the weights of the two new layers are always randomly initialized (Gaussian distribution with σ=0.001). Since new convolutional layers will reduce the size of the feature map, 2 pixels are zero-padded in each new intermediate 3×3 layer. As a result, all the stages in cascade training have the same size of the output, so that the training samples can be shared.

As a network goes deeper, it usually becomes more difficult for the training with existing methods to converge. For example, the SRCNN in Dong et al. 2016a failed to show superior performance with more than three layers. In Kim, Jiwon; Lee, Jung Kwon; and Lee, Kyoung Mu, *Accurate image super-resolution using very deep convolutional networks*, 2016 CVPR, pp. 1646-1654, which is incorporated by reference in its entirety (hereinafter, "VDSR"), a high initial learning rate is tuned and gradually decreased. But when using a large diverse training set (e.g., more than 30 million patches from 160,000 images), the high learning rate does not work well. A potential reason for this is that the high learning rate leads to vanishing/exploding gradients.

In CT-SRCNN, only a few weights are randomly initialized in each stage, so the convergence is relatively easy. A fixed learning rate 0.0001 for all layers in CT-SRCNN without any decay is also feasible. In order to accelerate the training, only the first stage need be changed, e.g., the learning rate of the first stage can be set to 0.001. In experiments/simulations, the 13-layer CT-SRCNN like the one in FIG. 4B has already achieved state-of-the-art accuracy, while using many less parameters compared to other networks such as VDSR or Kim, Jiwon; Lee, Jung Kwon; and Lee, Kyoung Mu, *Deeply-recursive convolutional network for image super-resolution*, 2016 CVPR, pp. 1637-1645, which is incorporated by reference in its entirety (hereinafter, "DRCN"). To the contrary, direct training of a randomly initialized deeper network requires a lot of effort in parameter tuning to ensure best convergence in these other networks, even though experiments have shown these networks may fail to converge with acceptable error.

As shown in Table 1 below, when two image qualities metrics, the peaks to noise ratio (PSNR) and the structure similarity measure (SSIM), are measured, it can be seen that the CT-SRCNN achieves better quality and faster speed. Moreover, the CT-SRCNN retrieves more details compared to VDSR and DRCN.

Given an L-layer CNN, assume the $i^{th}$ layer has $n_{i-1}$ input channels, a $k_i \times k_i$ convolution kernel, and $n_i$ filters. The number of parameters in the $i^{th}$ layer is $n_{i-1} \times n_i \times k_i \times k_i$. The bias term is ignored in this calculation. Then the overall number of parameters is $\Sigma_{i=1}^{L} n_{i-1} \times k_i \times k_i$. Thus, for example, in a 3-layer CT-SRCNN with 64-32-1 filters in each layer, $n_0=1$, $n_1=64$, $n_2=32$, $n_3=1$, $k_1=9$, $k_2=5$, $k_3=5$, so the overall number of parameters is $1\times64\times9\times9+64\times5\times5\times32+1\times32\times5 \ 5\times1=57,184$.

PSNR/SSIM are utilized to measure the image reconstruction quality. PSNR is the ratio between the maximum possible power of an image pixel and the power of corrupting noise that affects the fidelity. It is calculated as $$PSNR = 20\log_{10}\frac{255}{\sqrt{MSE}},$$

where the MSE is calculated between the ground truth and a reconstructed image (SR output). The larger the PSNR, the better the image quality. The maximum value of PSNR is infinite. See, e.g., definition of "Peak signal-to-noise ratio," downloaded on Jun. 27, 2017 from Wikipedia at https://en.wikipedia.org/wiki/Peak_signal-to-noise_ratio, which is incorporated by reference in its entirety.

SSIM is a perception-based model that considers image degradation as perceived change in structural information, while also incorporating the luminance masking and contrast masking. It is more consistent with human vision than PSNR. SSIM is calculated as $$SSIM = 20\log_{10}\frac{(2\mu_x\mu_y + c_1)(2\sigma_{xy} + c_2)}{(\mu_x^2 + \mu_y^2 + c_1)(\sigma_x^2 + \sigma_y^2 + c_2)},$$

where x is the reconstructed image, y is the reference image (ground truth), $\mu$ is the mean, $\sigma$ is the variance, $\sigma_{xy}$ is the covariance between x and y, $c_1=6.5025$, and $c_2=58.5225$. SSIM lays between [0,1]. If x is a perfect copy of y, the SSIM will be 1. See, e.g., definition of "Structural Similarity," downloaded on Jun. 27, 2017 from Wikipedia at https://en.wikipedia.org/wiki/Structural_similarity, which is incorporated by reference in its entirety.

TABLE I

Comparison of CT-SRCNN and existing approaches

| | Number of Parameters | PSNR | SSIM | Time per image (in seconds) |
|---|---|---|---|---|
| VDSR | >600,000 | 29.77 | 0.8314 | 0.17 |
| DRCN | >1,000,000 | 29.76 | 0.8311 | 4.19 |
| 13-layer Cascade Trained (only) SRCNN | ~150,000 | 29.91 | 0.8324 | 0.03 |
| Cascade trimmed 13-layer CT-SRCNN | ~120,000 | 29.91 | 0.8322 | 0.02 |

II. Cascade Network Trimming

Most neural networks have redundancy. Removing such redundancy clearly improves efficiency. In embodiments of the present disclosure, a major number of filters and/or weights may be removed from certain layers with a minor loss in accuracy.

This technique/approach (cascade network trimming) can be used with the cascade training described above, or can be used independent of cascade training. Given a deep convolutional neural network with acceptable accuracy or performance, techniques/approaches for reducing network size, computational complexity, and/or processing speed while keeping the network depth the same and not degrading the accuracy are always needed.

Similar to cascade training, cascade network trimming also includes an iterative process. In each stage, filters are trimmed from only d layers, which means that, for an L-layer network, the (L−(i−1)d−1)th layer to (L−id)th layer are trimmed in stage i. For example, when trimming d=2 layers from a 13-layer CT-SRCNN, the $12^{th}$ and $11^{th}$ layers are trimmed in the first stage i=1, and then the network is fine-tuned. When it converges, the second stage i=2 begins with trimming the $9^{th}$ and $10^{th}$ layers. This procedure is iteratively repeated until all of the layers are trimmed. Although the $13^{th}$ layer is ignored in the above procedure, the procedure may also be considered as trimming $12^{th}$ and $13^{th}$ layer in the first stage, and trimming $10^{th}$ and $11^{th}$ layer in the second stage, etc.

Figure 5:
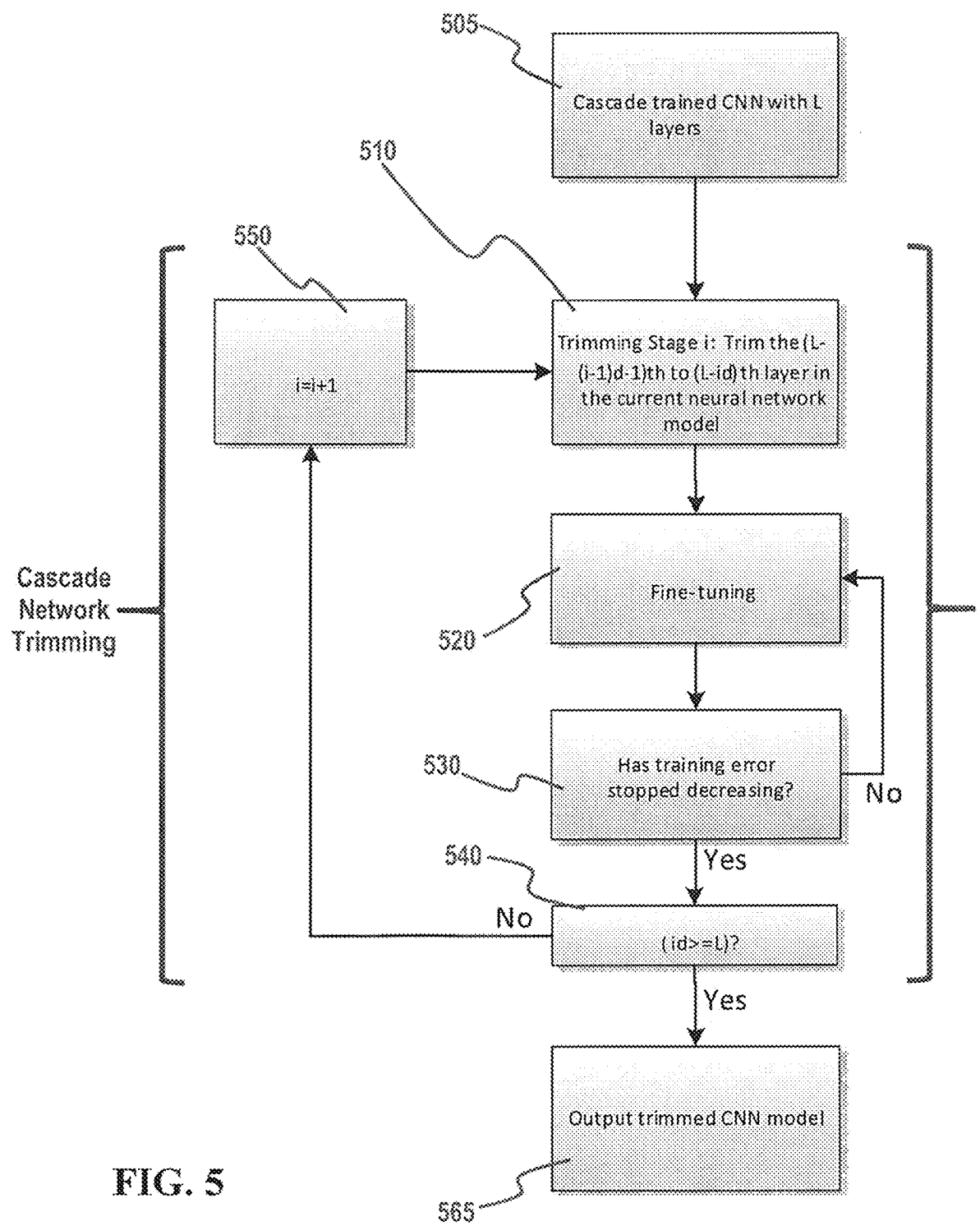
FIG. 5 illustrates an exemplary diagram of cascade network trimming, according to an embodiment of the present disclosure.

FIG. 5 illustrates an exemplary diagram of cascade network trimming, according to one embodiment of the present disclosure. At 505, the process of trimming begins with a trained CNN with L layers.

At 510, the trimming starts at stage i=1. As mentioned above, only d layers of the total L-layer CNN are trimmed in a stage. Thus, the (L−(i−1)d−1)th layer to (L−id)th layer are trimmed in stage i at 510. At 520, fine tuning is performed. At 530, it is determined whether the training error has stopped decreasing by a certain amount (from the previous stage). If it has, it is determined whether the total number of stages multiplied by the layers trimmed per stage is greater than or equal to the total number of layers at 540 ("(id>=L)?"). If the training error has not stopped decreasing at 530, the method returns to fine tuning at 520.

If it is determined that the total number of stages multiplied by the layers trimmed per stage is greater than or equal to the total number of layers at 540 ("(id>=L)?"), the process ends and the trimmed CNN model is output at 565. If it is determined that the total number of stages multiplied by the layers trimmed per stage is less than the total number of layers at 540 ("(id>=L)?"), the method begins the next stage at 550 ("i=i+1").

Figures 6A, 6B:
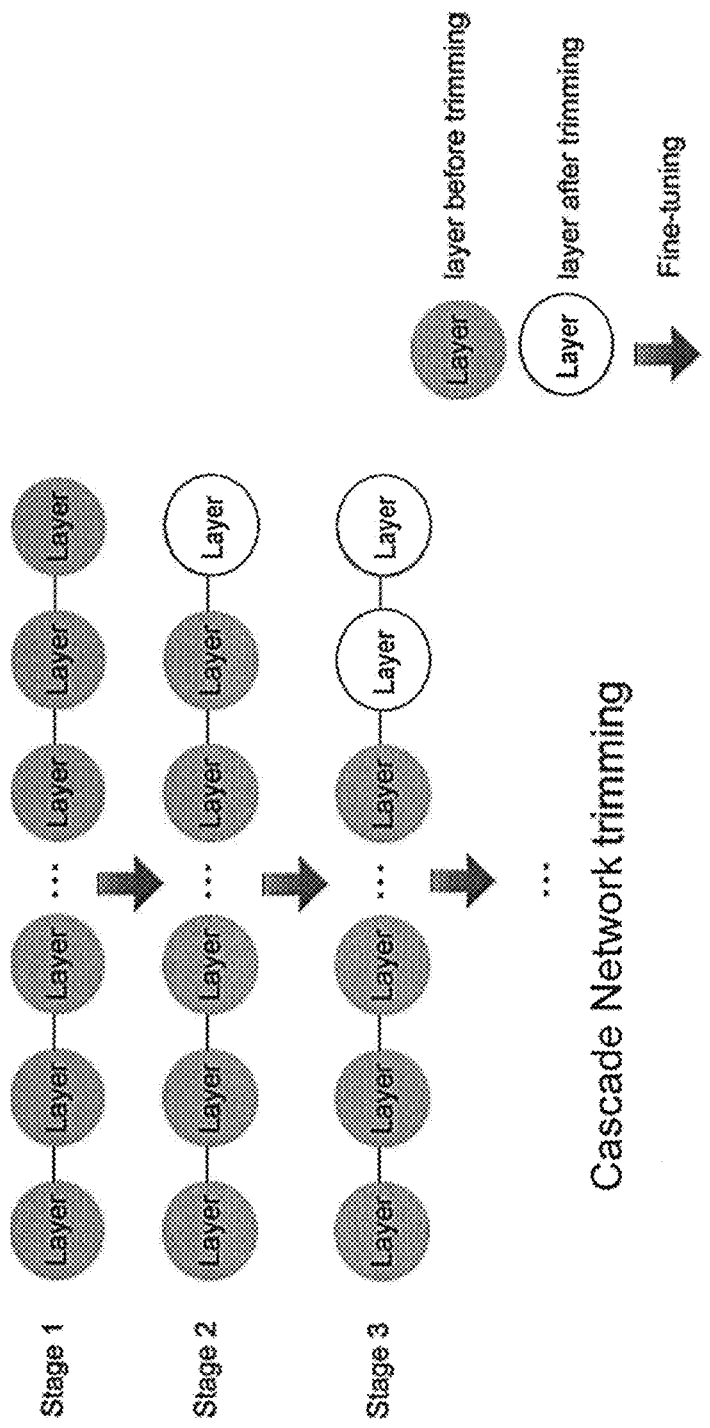
FIGS. 6A and 6B illustrate some of the differences between network trimming methods, according to an embodiment of the present disclosure.

FIGS. 6A and 6B illustrate some of the differences between network trimming methods in accordance with an embodiment of the present disclosure.

In FIG. 6A, one layer of the CNN is trimmed per stage, and fine tuning is performed between each stage, in accordance with an embodiment of the present disclosure. By contrast, all of the layers of the CNN in FIG. 6B are both fine-tuned and trimmed at the same time. Tuning and trimming all of the layers at the same time as shown in FIG. 6B is far more complex than the scheme shown in FIG. 6A.

Cascade network trimming is done by trimming whole filters from the layers. To recover any lost accuracy, trimming is done layer by layer, with fine-tuning till convergence after each trimmed layer or group of layers.

Figure 7:
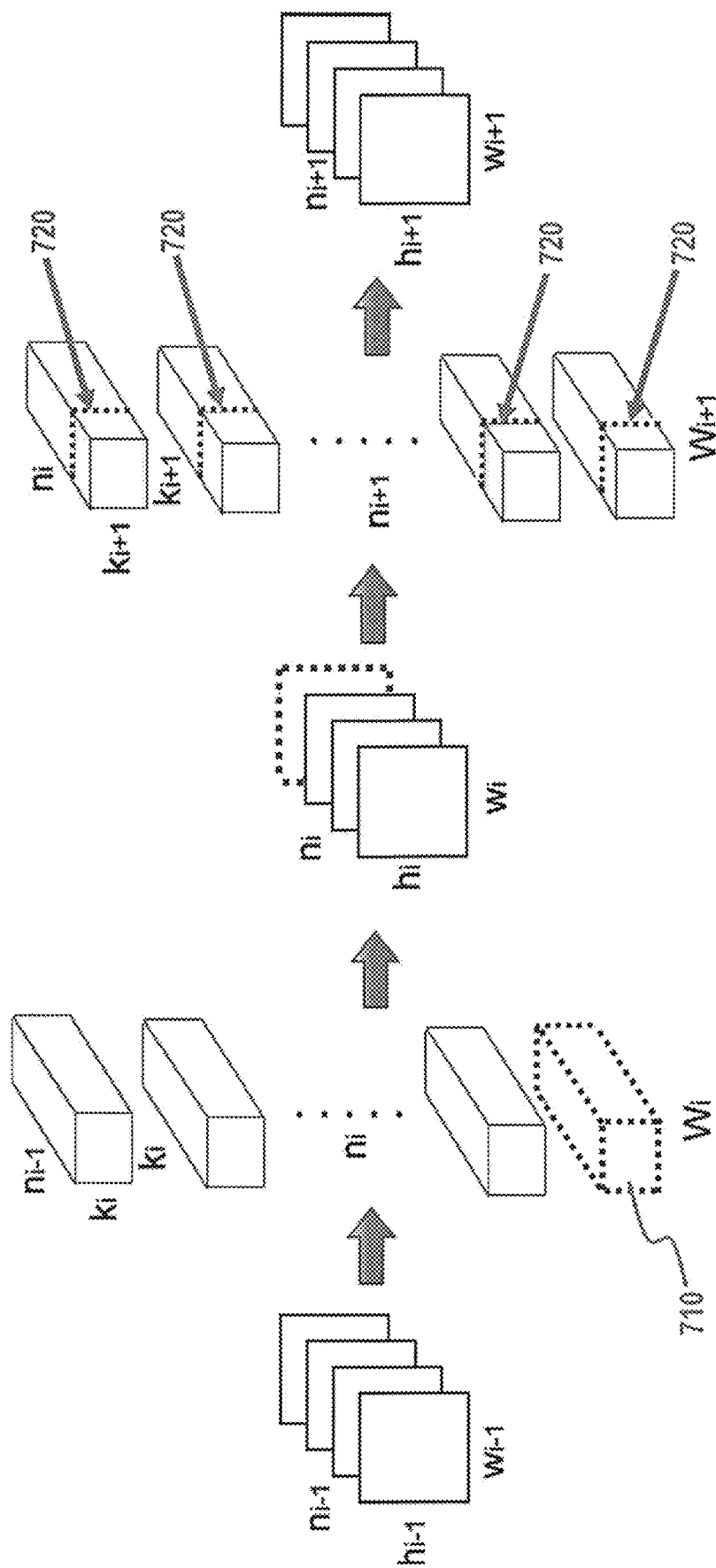
FIG. 7 illustrates an exemplary diagram for performing filter trimming according to an embodiment of the present disclosure.

As shown in FIG. 7, once a filter is trimmed, the adjacent layer will also be influenced. In FIG. 7, a filter 710 (block of dotted lines) is trimmed from the ith layer, $n_i = n_i - 1$, some weights 720 (indicated by the dotted lines within the filters) in the (i+1)th layer will also be trimmed. So trimming the filter in the ith layer will reduce the computational cost for both the ith and the (i+1)th layer. In CNN, the number of input channels of the (i+1)th layer is equal to the number of filters (output channel) of the ith layer.

In FIG. 7, assume there are $n_i = 4$ filters and $n_{i-1} = 5$ input channels in the ith layer, and $n_{i+1} = 10$ filters and $n_i = 4$ input channels in the (i+1)th layer before the trimming. If filter 710 is trimmed from the ith layer, the trimmed $n_i$ will be reduced to 3, and the $n_{i+1}$ is still 10. The slices 720 in the (i+1)th layer are the trimmed weights, which correspond to the multiplications. As mentioned in the last section, there will be $n_{i-1} \times k_i \times k_i \times n_i \times w_i \times h_i$ multiplications in the ith layer, and $n_i \times k_{i+1} \times k_{i+1} \times n_{i+1} \times w_{i+1} \times h_{i+1}$ multiplications in the (i+1)th layer. Since $n_i$ is reduced, the number of multiplications in both the ith layer and (i+1)th layer are also reduced.

An appropriate criteria is used to decide which filters are to be trimmed. In this embodiment, a measurement of relative importance is used. More specifically, the relative importance $R_{i,j}$ of the jth filter in the ith layer is defined by the square sum of all the weights in jth filter, where $W_{i,j}$ is the weights matrix of the jth filter in the ith layer, as shown in Equation (1):

$$R_{i,j} = \sum_{w \in W_{i,j}} w^2 \qquad (1)$$

Accordingly, the filters with the smallest $R_{i,j}$ are removed. As discussed above, when filter 710 is trimmed from the ith layer, some weights 720 in the (i+1)th layer will also be trimmed, resulting in $W'_{i+1,j}$. Thus, when calculating $R_{i+1,j}$, either the non-trimmed weights $W_{i+1,j}$ (also referred to as "independent trimming") are used in Equation (3), or the trimmed weights $W'_{i+1,j}$ are used in Equation (2):

$$R_{i+1,j} = \sum_{w \in W'_{i+1,j}} w^2 \qquad (2)$$

The algorithm below provides an exemplary high-level description of the iterative process for trimming filters from the layers.

---
Algorithm for Trimming Filters

Parameters
  $\epsilon_{filters,i}$, i = 1,...,L     rate of filter trimming
  for each layer
Input: CT-SRCNN model with L layers, each layer has $M_i$ filters
1. Repeat for i = 1, 2,...,L
   1.1 Calculate $R_{i,j}$, j = 1,...,$M_i$ for all the filters in the ith layer using (3) or (4)
   1.2 Remove the $\epsilon_{filters,i} \times M_i$ filters from the ith layer
   1.3 If i < L, remove the corresponding weights in i + 1th layer
2. Fine-tuning and output trimmed model

---

With different rates/thresholds $\epsilon_{weights}$ and $\epsilon_{filters,i}$, different trimmed models may be created. Since filter trimming influences the adjacent layers, fine-tuning will be needed to retrieve the accuracy in most cases where filter trimming is used. By contrast, weight pruning has a relatively smaller influence. With an appropriate trimming rate (e.g., less than 0.2), the accuracy will not decrease much even without fine-tuning.

III. Dilated Convolution

Dilated convolution, also known as à trous convolution, is a type of convolution which was originally developed for wavelet decomposition (see Holschneider, M.; Kronland-Martinet, R.; Morlet, J.; and Tchamitchian, Ph., *A Real-Time Algorithm for Signal Analysis with the Help of the Wavelet Transform* in WAVELETS: TIME-FREQUENCY METHODS AND PHASE SPACE, J. M. Combes et al., eds., pp. 286-297 (1987), which is incorporated by reference in its entirety), but has been applied to semantic segmentation, particularly in order to get dense features (see, e.g., Yu, Fisher and Koltun, Vladlen, *Multi-scale context aggregation by dilated convolutions*, 2016 Int'l Conference on Learning Representations (ICLR) (hereinafter, "Yu et al. 2016"), which is incorporated by reference in its entirety).

In a purely convolutional network composed of convolutions layers without pooling, the receptive field of units can only grow linearly layer by layer because the feature maps are generated based on convolving adjacent pixels from the input. A feasible way to increase the receptive field is to convolve the input pixels from a larger region. This is similar to using a 'dilation kernel' in dilation convolution instead of using the conventional dense kernel for conventional convolution.

Suppose F is a discrete function, K is a convolution kernel, and the dilated convolution $*_d$ is a generalized version of typical convolution, as defined by Equation (3) below, where d is the dilation factor. The conventional convolution is a simple 1-dilated convolution (i.e., when d=1).

$$F *_d K(z) = \sum_{x+dy=z} F(x)K(y) \quad (3)$$

One advantage of applying dilated convolution in a CNN is that the dilated version has a larger reception field, as illustrated in FIGS. 8A and 8B. The dilated convolutional filter is obtained by upsampling the original filter, i.e., by inserting zeros between its elements. Hence, by design the dilated filter has a structured pattern of zero elements. Compared to weight pruning, where the zero elements have a random pattern and location, dilated filters have a structured pattern for the zero weights, and are much more useful for reducing the computational complexity in hardware and software. Hence, for super resolution, embodiments of the present disclosure deploy the dilated filters differently than their typical usage, by keeping the same receptive field and instead using it to reduce the computational complexity in comparison to the non-dilated filter with the same receptive field.

FIGS. 8A and 8B illustrate some of the differences between dilated convolution in accordance with an embodiment of the present disclosure and conventional convolution, respectively. In FIG. 8B, conventional convolution is performed with stride two, while, in FIG. 8A, there is a 2-dilated convolution (meaning that the multiplication-and-accumulation operation in the convolution is applied every 2 pixels, instead of every pixel) with stride one according to an embodiment of the present disclosure. Although FIGS. 8A and 8B have the same feature map size (with padding for the dilated version), the reception field of the 2-dilated feature map is larger compared to the convolutional one. In a CNN, the input and output are 2-D feature maps so FIG. 8A or 8B are on the x-direction or y-direction only.

FIG. 8B illustrates an example of a conventional convolution with a size 3 kernel and stride 2, where the input is a 7-pixel signal (represented by 7 circles). In FIG. 8B, every 3 adjacent pixels are convolved (as indicated by the connecting lines) with the kernel and then generate an output (a square) of the feature map, beginning with the $1^{st}$ to $3^{rd}$ pixels (the lined circles) and the first output (the lined square) of the feature map The next convolution in FIG. 8B are the $3^{rd}$ to $5^{th}$ pixels because the stride is 2, and the next output (the black square) of the feature map consists of 3 elements, with receptive field 3.

By contrast, FIG. 8A illustrates an example of a 2-dilated convolution with a size 3 kernel and stride 1. In d-dilated convolution, the convolution is applied every d pixels. So the first output (the lined square) of the feature map is generated by convolving the $1^{st}$, $3^{rd}$, and $5^{th}$ pixels (lined circles) with the 3×3 kernel. Then the next output (the black square) is generated by convolving the $2^{nd}$, $4^{th}$, and $6^{th}$ pixels.

In an embodiment where all the layers in the CNN are convolutions with stride one, the dilated convolution may be applied in a different way. Given a k×k convolution kernel with stride one, the reception field of the resulting feature map is k×k. If 2-dilated convolution is used, the reception field of the resulting feature map is (2k−1)×(2k−1). For example, the 9×9 1-dilated layer 410 and a 5×5 1-dilated layer 413 of the CT-SRCNN in FIGS. 4A and 4B may be replaced by a 5×5 2-dilated layer and 3×3 2-dilated layer, respectively, instead. The resulting network will have the same size reception field, but less parameters due to the smaller kernel size.

Accordingly, in one embodiment, once a CT-SRCNN with a 9×9 1-dilated layer and two 5×5 1-dilated layers is trained, those layers may be replaced by a 5×5 2-dilated layer and two 3×3 2-dilated layers before fine tuning is performed. Unlike Yu et al. 2016, a dilated CT-SRCNN according to an embodiment of the present disclosure does not need any zero padding in the dilated layer.

As mentioned above, many researchers are attempting to increase the accuracy and efficiency of SRNNs by, for example, using more layers (e.g., VDSR) or a deeply recursive structure (e.g., DRCN). Other researchers similarly propose to use more complicated networks. Wang, Zhaowen; Liu, Ding; Yang, Jianchao; Han, Wei; and Huang, Thomas, *Deep networks for image super-resolution with sparse prior*, 2015 IEEE Int'l Conference on Computer Vision (ICCV), pp. 370-378, which is incorporated herein by reference, integrated a sparse representation prior with feedforward network based on the learned iterative shrinkage and thresholding algorithm. VDSR increased the number of layers to 20 and used small filters and a high learning rate with adjustable gradient clipping; the same group also designed a deep recursive CNN with recursive-supervision and skip-connection in DRCN. Dahl, Ryan; Norouzi, Mohammad; and Shlens, Jonathon, *Pixel Recursive Super Resolution*, arXiv 1702.00783 [22 Mar. 2017], which is incorporated herein by reference, combined the ResNet with a Pixel Recursive Super Resolution, which showed promising results on face and bed SR where super resolution is applied to bed images).

Others prefer to use perception loss instead of the mean square error (MSE) for the training error, which is closer to natural texture and human vision. Sønderby, Casper; Caballero, Jose; Theis, Lucas; Shi, Wenzhe; and Huszár, Ferenc, *Amortised MAP Inference for Image Super-resolution*, arXiv 1610.04490 [21 Feb. 2017], which is incorporated herein by reference, introduced a method for amortised MAP inference, which calculated the MAP estimation directly using CNN. Johnson, Justin; Alahi, Alexandre; and Fei-Fei, Li, *Perceptual losses for real-time style transfer and super-resolution*, 2016 ECCV, pp. 694-711, which is incorporated herein by reference, proposed the use of perceptual loss functions for training feedforward networks for image transformation tasks. Ledig, Christian, et al., *Photo-realistic single image super-resolution using a generative adversarial network*, arXiv 1609.04802 [13 Apr. 2017], which is incorporated herein by reference, employed a very deep residual network (ResNet), and further presented the super resolution generative adversarial network (SRGAN) to obtain the images similar to natural texture.

However, although the works listed above improved the accuracy of the SR system, the improved accuracy was at the cost of having more layers/parameters and/or more difficult hyperparameter tuning procedures. In other words, any advance in accuracy was counter-balanced by extreme increases in complexity.

Other researchers focused on improving efficiency by extracting the feature maps in LR space and training using upscaling filters. Shi, Wenzhe, et al., *Real-time Single Image and Video Super-Resolution Using an Efficient sub-pixel convolutional neural network*, 2016 CVPR, pp. 1874-1883, which is incorporated herein by reference, introduced an efficient subpixel convolutional layer which learned an array of upscaling filters to upscale the LR feature maps into the HR output. Dong, Chao; Loy, Chen Change; and Tang, Xiaoou, *Accelerating the super-resolution convolutional neural network*. 2016 ECCV, pp. 391-407, which is incorporated herein in its entirety (hereinafter, "Dong et al. 2016b"), re-designed the SRCNN by adding smaller filters, a deconvolution layer, and feature space shrinkage to accelerate the speed without losing the accuracy.

However, due to the use of the upscaling layer, the patch size and context reception field of these networks will be relatively small. As a result, the accuracy is relatively lower compared to extracting feature maps from upsampled LR space.

By contrast, the CT-SRCNN described herein can go deeper, thereby achieving high accuracy, without the heavy tuning of parameters. The network size of the CT-SRCNN is much smaller compared to the state-of-the-art solutions, such as those listed above. The CT-SRCNN can also process 20-25 frames/second of video with a resolution of 720×480 in a single GPU. This efficiency could be further enhanced by network trimming and dilated convolution.

In this disclosure, a cascade training method is described which trains deep CNN for super resolution with both high accuracy and efficiency. The cascade training ensures that the network might consistently go deeper with a relatively smaller size. The network trimming and dilated convolution described herein further reduce the network complexity. The experimental results on benchmark image and video datasets show that the disclosed method herein achieves competitive performance compared to other state-of-the-art solutions, but at much higher speeds.

Although described in the framework of image super-resolution, the techniques described herein can be generalized any type of CNN for any type of purpose, such as denoising, or image restoration.

Figure 9:
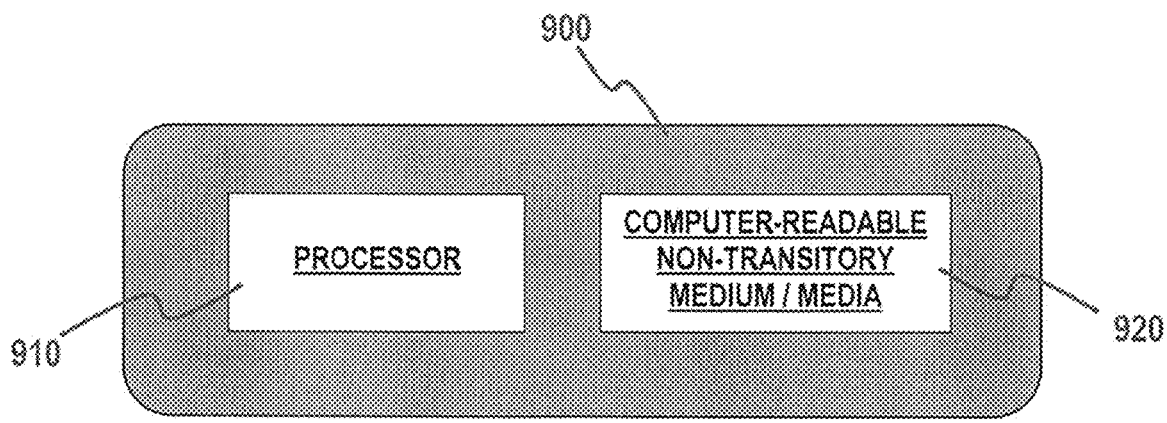
FIG. 9 illustrates an exemplary diagram of the present apparatus, according to one embodiment.

FIG. 9 illustrates an exemplary diagram of the present apparatus, according to one embodiment. An apparatus 900 includes at least one processor 910 and one or more non-transitory computer readable media 920. The at least one processor 910, when executing instructions stored on the one or more non-transitory computer readable media 920, performs the steps of training a CNN having three or more layers; performing cascade training on the trained CNN to add one or more intermediate layers until a training error is less than a threshold; and performing network trimming of the CNN output from the cascade training. Moreover, the one or more non-transitory computer-readable media 1020 stores instructions for the at least one processor 910 to perform the steps of training a CNN having three or more layers; performing cascade training on the trained CNN to add one or more intermediate layers until a training error is less than a threshold; and performing network trimming of the CNN output from the cascade training.

Figure 10:
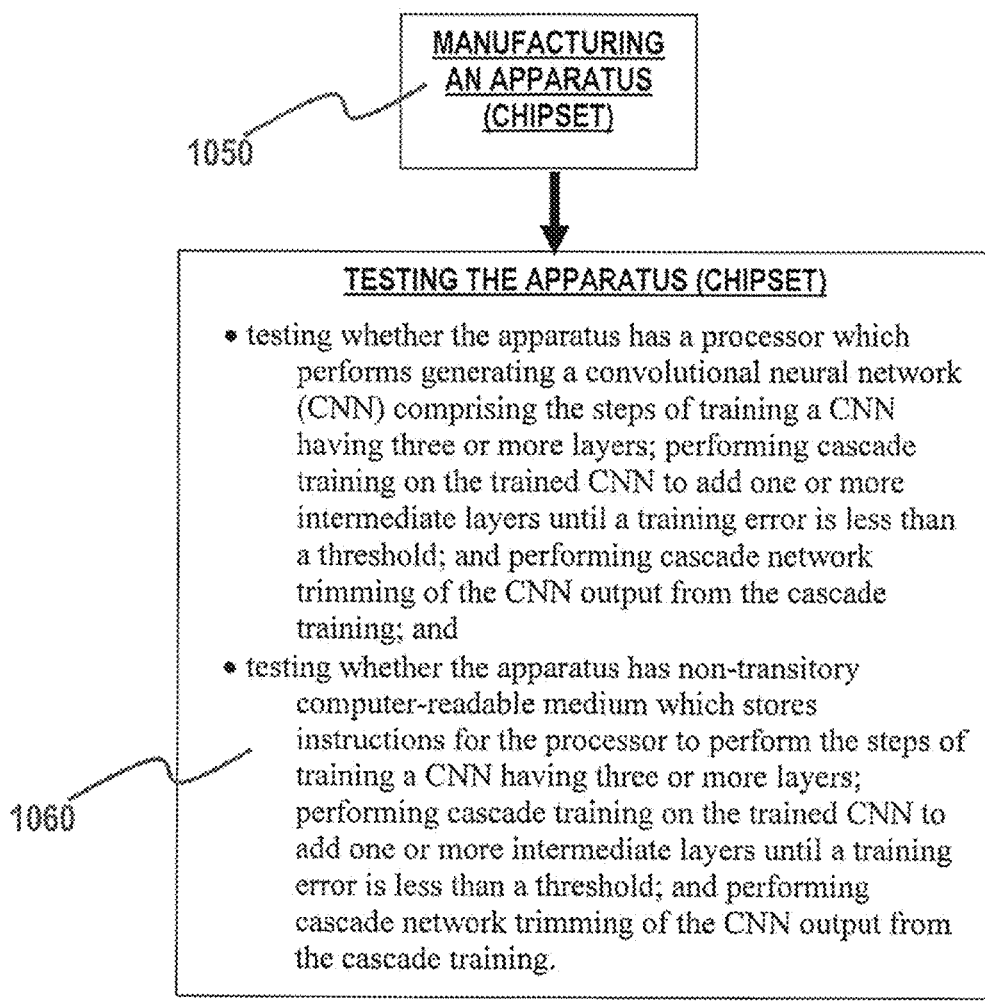
FIG. 10 illustrates an exemplary flowchart for manufacturing and testing the present apparatus, according to one embodiment.

FIG. 10 illustrates an exemplary flowchart for manufacturing and testing the present apparatus, according to one embodiment.

At 1050, the apparatus (in this instance, the chipset described above) is manufactured, including at least one processor and one or more non-transitory computer-readable media. When executing instructions stored on the one or more non-transitory computer readable media, the at least one processor performs the steps of training a CNN having three or more layers; performing cascade training on the trained CNN to add one or more intermediate layers until a training error is less than a threshold; and performing network trimming of the CNN output from the cascade training. The one or more non-transitory computer-readable media store instructions for the at least one processor to perform the steps of training a CNN having three or more layers; performing cascade training on the trained CNN to add one or more intermediate layers until a training error is less than a threshold; and performing network trimming of the CNN output from the cascade training.

At 1060, the apparatus (in this instance, a chipset) is tested. Testing 1060 includes testing whether the apparatus has at least one processor which, when executing instructions stored on one or more non-transitory computer readable media, performs the steps of training a CNN having three or more layers; performing cascade training on the trained CNN to add one or more intermediate layers until a training error is less than a threshold; and performing network trimming of the CNN output from the cascade training; and testing whether the apparatus has the one or more non-transitory computer-readable media which store instructions for the at least one processor to perform the steps of training a CNN having three or more layers; performing cascade training on the trained CNN to add one or more intermediate layers until a training error is less than a threshold; and performing network trimming of the CNN output from the cascade training.

The steps and/or operations described above in relation to an embodiment of the present disclosure may occur in a different order, or in parallel, or concurrently for different epochs, etc., depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple microcontrollers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Some embodiments of the present disclosure may be implemented, at least in part, on a portable device. "Portable device" and/or "mobile device" as used herein refers to any portable or movable electronic device having the capability of receiving wireless signals, including, but not limited to, multimedia players, communication devices, computing devices, navigating devices, etc. Thus, mobile devices include (but are not limited to) user equipment (UE), laptops, tablet computers, portable digital assistants (PDAs), mp3 players, handheld PCs, instant messaging devices (IMD), cellular telephones, global navigational satellite system (GNSS) receivers, watches, or any such device which can be worn and/or carried on one's person.

Various embodiments of the present disclosure may be implemented in an integrated circuit (IC), also called a microchip, silicon chip, computer chip, or just "a chip," as would be understood by one of ordinary skill in the art, in view of the present disclosure. Such an IC may be, for example, a broadband and/or baseband modem chip.

While several embodiments have been described, it will be understood that various modifications can be made without departing from the scope of the present disclosure. Thus, it will be apparent to those of ordinary skill in the art that the present disclosure is not limited to any of the embodiments described herein, but rather has a coverage defined only by the appended claims and their equivalents.

APPENDIX: EXPERIMENTAL VALIDATION

A. Cascade Training

TABLE A-II

Comparison of cascade training versus conventional training in Set14, scale3

|  | PSNR | SSIM |
| --- | --- | --- |
| CT-SRCNN 5-layer | 29.44 | 0.8232 |
| Non-CT-SRCNN 5-layer | 29.56 | 0.8258 |
| CT-SRCNN 7-layer | 29.50 | 0.8245 |
| Non-CT-SRCNN 7-layer | 29.71 | 0.8287 |
| CT-SRCNN 9-layer | 29.52 | 0.8250 |
| Non-CT-SRCNN 9-layer | 29.75 | 0.8299 |
| CT-SRCNN 13-layer | 29.56 | 0.8265 |
| Non-CT-SRCNN 13-layer | 29.91 | 0.8324 |

In Table A-II, the PSNR/SSIM of a cascade trained CNN in accordance with the present disclosure is compared to non-cascade trained CNN with unsupervised weight initialization from VDSR. It can be seen that with the same network architecture, the PSNR/SSIM of CT-SRCNN is clearly better than non-cascade training.

Figure 11:
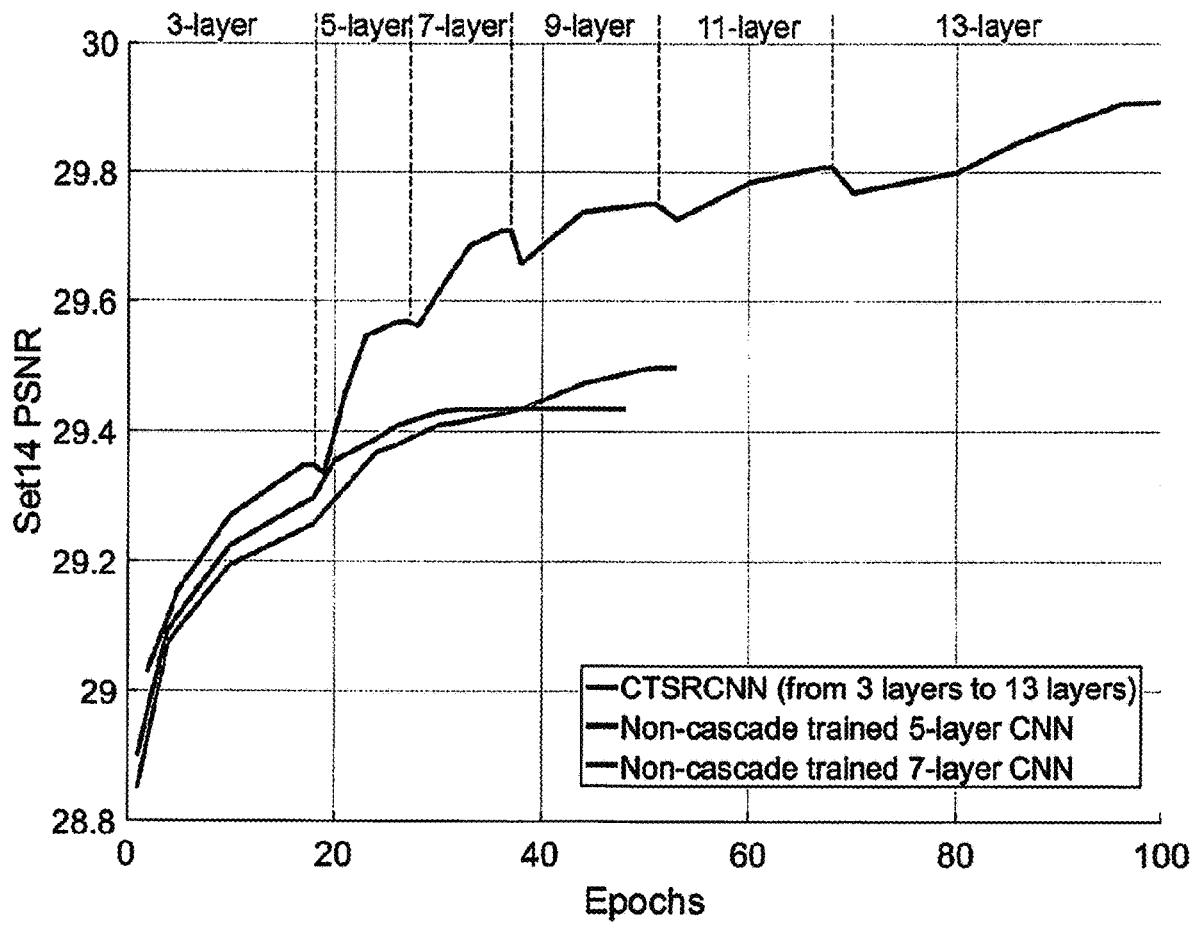
FIG. 11 is an exemplary diagram illustrating the convergence speed of cascade trained CNNs according to an embodiment of the present disclosure vs. non-cascade trained CNNs in experiments discussed in the Appendix hereto.

FIG. 11 is an exemplary diagram illustrating the convergence speed of cascade trained CNNs according to an embodiment of the present disclosure vs. non-cascade trained CNNs. The CT-SRCNN is found to converge faster compared to non-CT-SRCNN. The accuracy of the CT-SRCNN consistently increases when more layers are utilized. This indicates that cascade network training also trains SRCNNs deeper and deeper. Cascade network training performs better compared to conventional training in both accuracy and convergence speed.

In Table A-III, the number of parameters, PSNR, SSIM, and time per image of a CT-SRCNN-13 in accordance with the present disclosure is compared to known SR networks in scale 3.

TABLE A-III

Comparison of cascade training versus existing networks in Set14, scale3

|  | Number of Parameters | Set 14 PSNR | Set 14 SSIM | Time per image (in seconds) |
| --- | --- | --- | --- | --- |
| VDSR | >600,000 | 29.77 | 0.8314 | 0.17 |
| DRCN | >1,000,000 | 29.76 | 0.8311 | 4.19 |
| 13-layer CT-SRCNN-13 | ~150,000 | 29.91 | 0.8324 | 0.03 |

B. Cascade Network Trimming

Table A-IV shows that the cascade trimmed CT-SRCNN (where 4 out of the 13 layers are trimmed) achieves similar performance to the non-cascade trimmed CT-SRCNN, but the network size is reduced 20%. Cascade network trimming according to the present disclosure is also applied to another network, namely, the FSRCNN (see Dong et al. 2016b). This network consists of 7 convolutional layers and one deconvolution layer. Similar to trimming the CT-SRCNN according to an embodiment of the present disclosure above, 2 layers of the FSRCNN are also trimmed in each stage. Table A-IV shows that network cascade trimming according to the present disclosure is also effective for FSRCNN.

TABLE A-IV

Evaluation of cascade trimmed networks in Set14, scale3

|  | Number of Parameters | PSNR | SSIM | Time per image (in seconds) |
|---|---|---|---|---|
| CT-SRCNN 13 layer, no trimming | ~150,000 | 29.91 | 0.8324 | 0.03 |
| Cascade trimmed 13-layer CT-SRCNN, trim 4 layers | ~120,000 | 29.91 | 0.8322 | 0.02 |
| FSRCNN 8 layer, no trimming | ~12,000 | 29.52 | 0.8246 | 0.009 |
| Cascade trimmed FSRCNN 8 layer, trim 2 layers | ~8,500 | 29.51 | 0.8244 | 0.008 |
| Cascade trimmed FSRCNN 8 layer, trim 4 layers | ~6,800 | 29.35 | 0.8228 | 0.007 |
| Cascade trimmed FSRCNN 8 layer, trim 6 layers | ~4,900 | 29.35 | 0.8208 | 0.006 |
| Cascade trimmed FSRCNN 8 layer, trim 8 layers | ~3,400 | 29.22 | 0.8189 | 0.005 |
| FSRCNN official lite version | ~3,900 | 29.17 | 0.8175 | 0.006 |

There is a trade-off between the trimming rate and the accuracy. If only 2 layers (the $7^{th}$ and $8^{th}$) are trimmed, there is almost no accuracy loss, while 30% of the parameters are removed. If all 8 layers are trimmed (Cascade trimmed FSRCNN 8 layer, trim 8 layers), the accuracy is still better compared to the official model (FSRCNN official lite version), with a smaller network size (3,400 compared to 3,900 parameters).

C. Dilated Convolution

Table A-V shows the experimental results of a dilated 13-layer CT-SRCNN. The dilation is applied for the first 9×9 layer, the second 5×5 layer, and the last 5×5 layer. Instead, 5×5, 3×3, and 3×3 2-dilated convolutional layers are utilized. It can be seen that the dilated version of CT-SRCNN can achieve similar PSNR/SSIM to the non-dilated version, but the network size is clearly reduced.

TABLE A-V

Evaluation of dilated CT-SRCNN on Set14, scale 3

|  | Number of Parameters | PSNR | SSIM | Time per image (in seconds) |
|---|---|---|---|---|
| CT-SRCNN 13 layer | ~150,000 | 29.91 | 0.8324 | 0.03 |
| Dilated CT-SRCNN 13 layer | ~110,000 | 29.90 | 0.8324 | 0.02 |

What is claimed is:

1. A method of generating a convolutional neural network (CNN), comprising:
   training a CNN having three or more layers; and
   performing cascade training on the trained CNN to insert one or more intermediate layers into the CNN until a training error is less than a threshold,
   wherein cascade training comprises an iterative process of one or more stages, in which each stage comprises:
      training the current CNN;
      determining whether the training error is converging; and
      if the training error is converging,
         inserting a preset number of intermediate layers in the CNN, the weights of each new layer being set to, a predetermined setting; and
         starting a new stage.

2. The method of claim 1, wherein each stage of the cascade training iterative process further comprises:
   if the training error is not converging, determining whether the current training error is less than the threshold;
   if the current training error is less than the threshold, outputting the cascade trained CNN; and
   if the current training error is not less than the threshold, starting a new stage.

3. The method of claim 2, wherein the predetermined setting of each new layer is randomly initialized with a Gaussian distribution with zero mean and standard deviation U.

4. The method of claim 1, wherein the CNN is a super-resolution CNN (SRCNN) for processing at least one of images or video.

5. The method of claim 1, further comprising:
   performing cascade network trimming after performing cascade training.

6. The method of claim 5, wherein cascade network trimming comprises an iterative process of one or more stages, in which each stage comprises:
   trimming a set number of layers of the current CNN by reducing dimensions of filters at one or more intermediate layers;
   determining whether the training error is converging; and
   if the training error is converging, determining whether all of the layers of the current CNN have been trimmed;
   if all of the layers of the current CNN have been trimmed, outputting the network trimmed CNN; and
   if all of the layers of the current CNN have not been trimmed, starting a new stage.

7. The method of claim 6, wherein the cascade network trimming iterative process further comprises:
   if the training error is not converging, outputting the CNN at a cascade trimming stage where the training error was last converging.

8. The method of claim 1, wherein the cascade training is performed using dilated convolutional filters.

9. A method of generating a convolutional neural network (CNN), comprising:
   training a CNN having three or more layers; and
   performing cascade network trimming of the trained CNN,
   wherein the cascade network trimming comprises an iterative process of one or more stages, in which each stage comprises:
      trimming a set number of layers of the current CNN by reducing dimensions of filters at one or more intermediate layers;
      determining whether the training error is converging; and
      if the training error is converging, determining whether all of the layers of the current CNN have been trimmed;
      if all of the layers of the current CNN have been trimmed, outputting the network trimmed CNN; and if all of the layers of the current CNN have not been trimmed, starting a new stage.

10. The method of claim 9, wherein the cascade network trimming iterative process further comprises:
if the training error is not converging, outputting the CNN at a cascade trimming stage where the training error was last converging.

11. The method of claim 9, wherein each stage of the cascade network trimming iterative process further comprises:
fine tuning before determining whether the current training error is less than the threshold.

12. The method of claim 9, wherein trimming the set number of layers of the current CNN comprises, for each layer:
trimming filters that do not meet a certain criteria.

13. The method of claim 12, wherein the certain criteria comprises a measure of relative importance.

14. The method of claim 9, wherein the CNN is a super-resolution CNN (SRCNN) for processing at least one of images or video.

15. The method of claim 9, further comprising:
performing cascade training before cascade network trimming.

16. The method of claim 15, wherein cascade training comprises an iterative process of one or more stages, in which each stage comprises:
training the current CNN;
determining whether the training error is converging; and
if the training error is converging,
inserting a preset number of intermediate layers in the CNN, the weights of each new layer being set to a predetermined setting; and
starting a new stage.

17. The method of claim 16, wherein each stage of the cascade training iterative process further comprises:
if the training error is not converging, determining whether the current training error is less than the threshold;
if the current training error is less than the threshold, outputting the cascade trained CNN; and
if the current training error is not less than the threshold, starting a new stage.

18. The method of claim 16, wherein the predetermined setting of each new layer is randomly initialized with a Gaussian distribution with zero mean and standard deviation a.

19. The method of claim 16, wherein the cascade training is performed using dilated convolutional filters.

20. An apparatus for generating a convolutional neural network (CNN), comprising:
one or more non-transitory computer-readable media; and
at least one processor which, when executing instructions stored on one or more non-transitory computer readable media, performs the steps of:
training a CNN having three or more layers;
performing cascade training on the trained CNN to add one or more intermediate layers until a training error is less than a threshold; and
performing network trimming of the CNN output from the cascade training.

21. The apparatus of claim 20, wherein cascade training comprises an iterative process of one or more stages, in which each stage comprises:
training the current CNN;
determining whether the training error is converging; and
if the training error is converging,
inserting a preset number of intermediate layers in the CNN, the weights of each new layer being set to a predetermined setting; and
starting a new stage.

22. The apparatus of claim 20, wherein the cascade training is performed using dilated convolutional filters.

23. The apparatus of claim 20, wherein cascade network trimming comprises an iterative process of one or more stages, in which each stage comprises:
trimming a set number of layers of the current CNN by reducing dimensions of filters at one or more intermediate layers;
determining whether the training error is converging; and
if the training error is converging, determining whether all of the layers of the current CNN have been trimmed;
if all of the layers of the current CNN have been trimmed, outputting the network trimmed CNN; and
if all of the layers of the current CNN have not been trimmed, starting a new stage.

24. The apparatus of claim 21, wherein the CNN is a super-resolution CNN (SRCNN) for processing at least one of images or video.

25. A method, comprising:
manufacturing a chipset comprising:
at least one processor which, when executing instructions stored on one or more non-transitory computer readable media, performs the steps of:
training a CNN having three or more layers;
performing cascade training on the trained CNN to add one or more intermediate layers until a training error is less than a threshold; and
performing cascade network trimming of the CNN output from the cascade training; and
the one or more non-transitory computer-readable media which store the instructions.

26. A method of testing an apparatus, comprising:
testing whether the apparatus has at least one processor which, when executing instructions stored on one or more non-transitory computer readable media, performs the steps of:
training a CNN having three or more layers;
performing cascade training on the trained CNN to add one or more intermediate layers until a training error is less than a threshold; and
performing cascade network trimming of the CNN output from the cascade training;
testing whether the apparatus has the one or more non-transitory computer-readable media which store the instructions.

* * * * *